Oct. 25, 1938.   G. LONG ET AL   2,134,567
BAG FILLING AND CLOSING MACHINE
Filed June 29, 1936   9 Sheets-Sheet 3

Inventors:
George Long,
Elwell B. Larsen,

Oct. 25, 1938.                G. LONG ET AL                2,134,567
                        BAG FILLING AND CLOSING MACHINE
                        Filed June 29, 1936        9 Sheets-Sheet 5

Inventors:
George Long,
Elwell B. Larsen,

Oct. 25, 1938.　　G. LONG ET AL　　2,134,567
BAG FILLING AND CLOSING MACHINE
Filed June 29, 1936　　9 Sheets-Sheet 6

Inventors:
George Long,
Elwell B. Larsen.

Inventors:
George Long,
Elwell B Larsen,

Patented Oct. 25, 1938

2,134,567

UNITED STATES PATENT OFFICE 2,134,567

BAG FILLING AND CLOSING MACHINE

George Long, Joliet, and Elwell B. Larsen, Chicago, Ill., assignors, by mesne assignments, to Franklin Steel Works, Joliet, Ill., a corporation of Maine Application June 29, 1936, Serial No. 87,972

20 Claims. (Cl. 93—6)

The invention relates to new and useful improvements in bag filling and closing machines and has particular reference to mechanism for filling a bag, collapsing the top of the filled bag, and folding the collapsed top, the several operations being performed at a plurality of stations.

An object of the invention is to provide in a bag filling and closing machine improved conveyor mechanism for intermittently moving an open bag from station to station throughout a plurality of stations comprising the machine; to provide novel collapsing mechanism for tucking in the side walls and for bringing the front and rear walls together to collapse the upper portion of the bag; and to provide mechanism of improved construction for folding the collapsed upper portion of the bag to close and substantially seal the same, preventing leakage of the contents of the bag.

Another object of the invention is to provide a bag filling and closing machine which will automatically locate an open bag in an intermittently moving holder fixed to an endless conveyor, which will locate the bag under a filling hopper, bring the bag into association with collapsing mechanism, and subsequently folding, creasing and pressing mechanisms, whereby the bag is delivered from the machine with the upper portion folded in a plurality of secure folds and which are in flat contact with the top of the bag.

A further object is to provide bag closing instrumentalities which will successively fold, crease the fold, fold again and crease, and lastly press the folded portion flat into contact with the top of the bag.

Another object is to provide elevating structure for vertically positioning the bags when located under the folding and creasing mechanisms in order to locate the upper collapsed portion thereof in proper relation with respect to said mechanisms.

With these and various other objects in view, the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figures 10, 12:
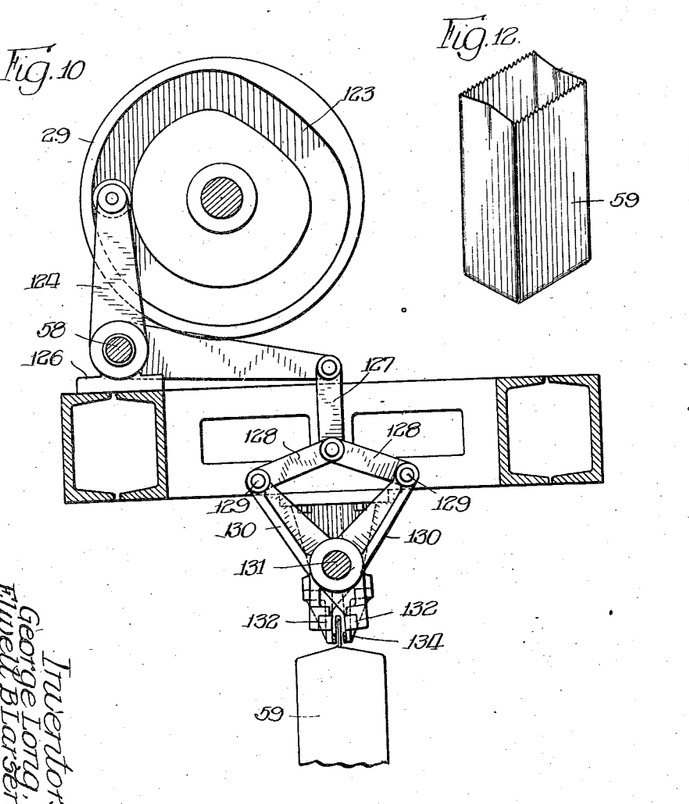
Figure 10 is a fragmentary vertical sectional view showing in detail the creasing mechanism.
Figure 12 is a perspective view showing an open bag of the type adapted to be closed by the present machine.

The present invention contemplates a bag filling and closing machine which will include means for opening paper bags, similar to that shown in Figure 12, means for filling said bags, mechanism for collapsing the upper portion thereof by tucking inwardly the side walls and simultaneously bringing the front and rear walls together, folding means for folding the collapsed upper portion a plurality of times, and means for creasing each fold immediately after the respective folding operation. When the machine is using bags provided with vertical stays or metal strips in the upper portion thereof, the folding and creasing operations substantially close the bag, with the exception of the last operation, which presses the folded portion into flat contact with the top of the bag. In the packaging of certain materials it is necessary to completely seal the folded portion of the bag by gluing said portion to the body thereof, and novel mechanism is likewise provided by the invention for efficiently performing this function.

Figure 1:
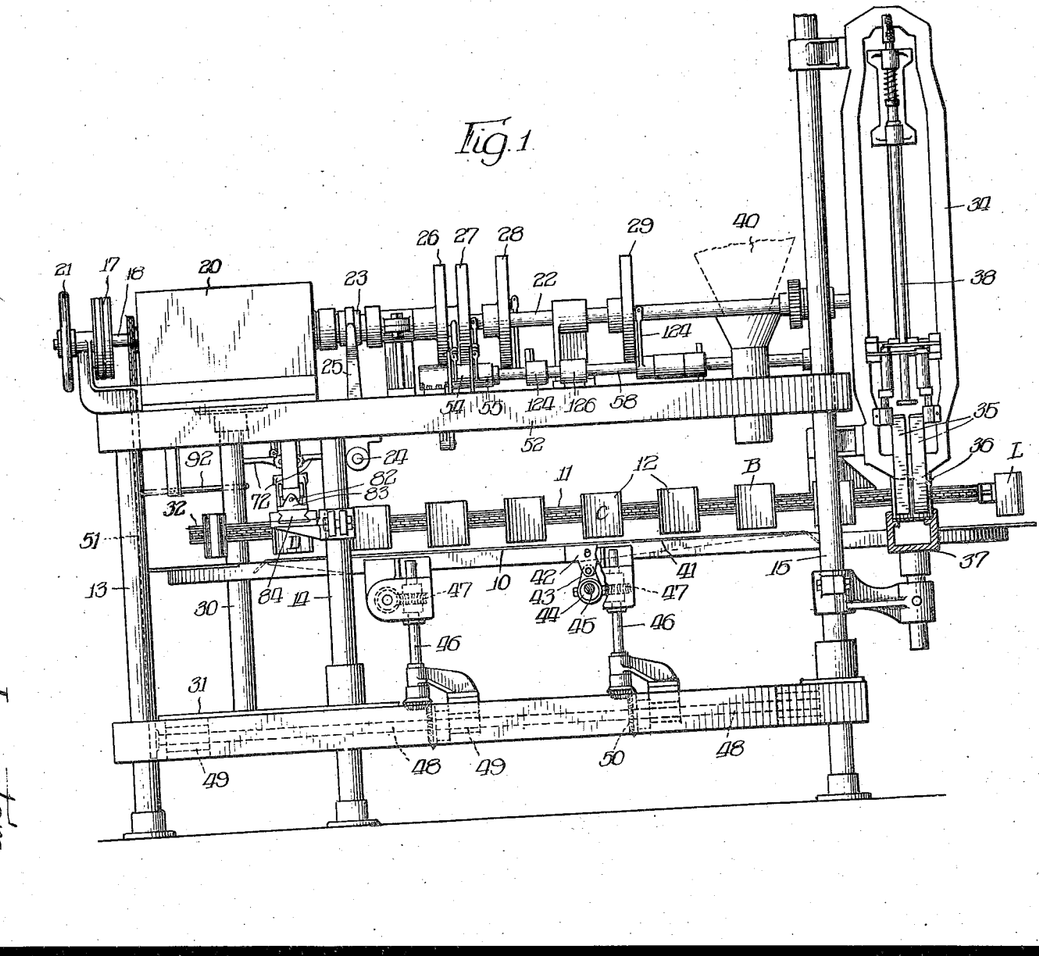
Figure 1 is an elevational view of the bag filling and closing machine forming the subject matter of the present invention, showing the front side where the bags are opened, filled and closed by bringing the upper portion of the front and rear walls together.
Figure 2:
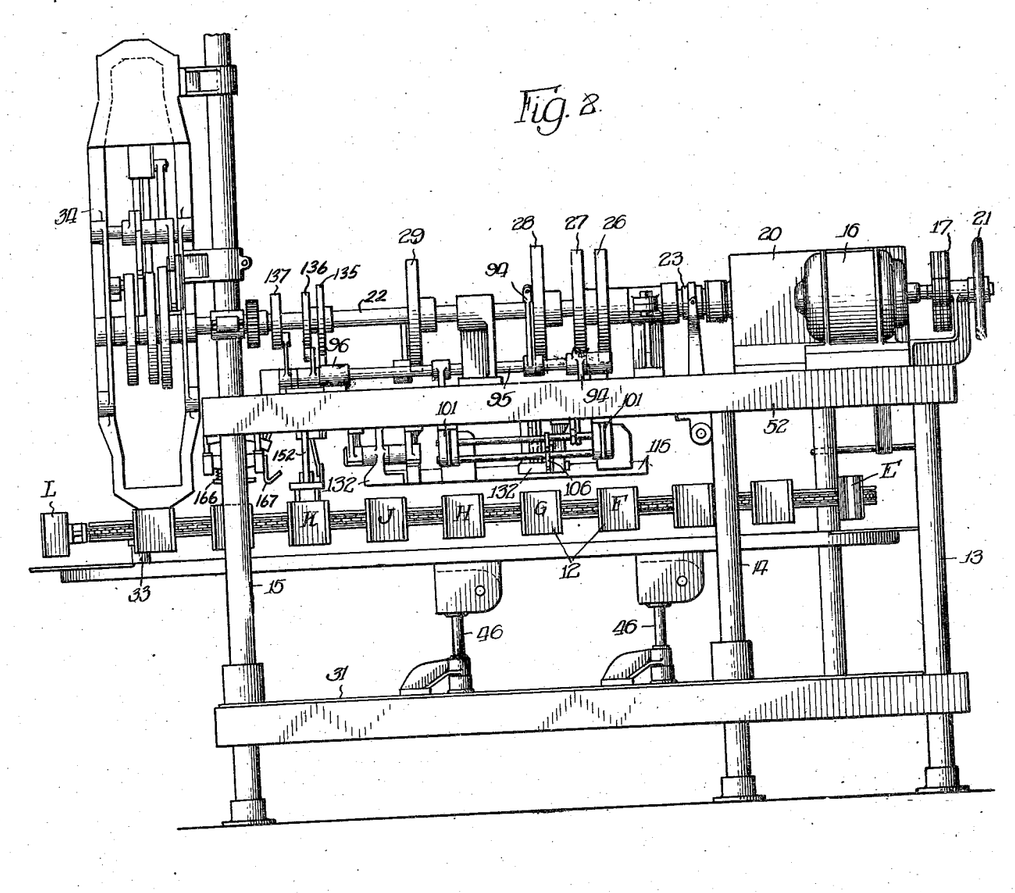
Figure 2 is an elevational view of the bag filling and closing machine of Figure 1, showing the exit side of the machine where the bags are folded, sealed and discharged from the conveyor.

Referring more particularly to Figures 1 and 2 of the drawings, which disclose the preferred embodiment of the present invention, numeral 10 indicates the horizontal support for the bags, which is of substantially elliptical shape, the bags being intermittently propelled by an endless conveyor 11 to which is fixed the holders 12. The support is suitably fastened to uprights 13, 14 and 15, which rest on the foundation for the machine. The driving means for driving the endless conveyor 11 and actuating the various mechanisms consists of an electric motor 16, Figure 2, having fixed to its rotor shaft a pinion over which passes the endless chain 17 for rotating the shaft 18, suitably journalled by the gear housing 20. Shaft 18 may be rotated by hand, independently of the motor, through operation of the hand wheel 21. Within the housing 20 are located the transmission gears for operatively connecting the driving shaft 18 with the operating shaft 22, said operating shaft being connected to the transmission by the clutch, indicated generally by numeral 23, manually actuated from shaft 24 by means of the clutch lever 25. Suitably fixed to the operating shaft 22 are a plurality of cams 26, 27, 28 and 29. As will be more particularly described, cams 26 and 27 actuate the collapsing mechanism for folding inwardly the side walls of the bag and for bringing the front and rear walls together, and cams 28 and 29 actuate the folding mechanisms and creasing mechanisms, respectively. A shaft 30 depends from the gear housing 20 and is journalled at its lower end in member 31, suitably fixed to uprights 13 and 14. Said shaft carries a sprocket wheel 32 over which passes the endless conveyor chain 11. At the opposite end of the support there is provided a stub shaft 33 for supporting a sprocket over which the conveyor chain likewise passes.

The numeral 34 designates the supporting frame for the bag opening mechanism, which essentially consists of vertically reciprocating fingers 35 also having pivotal movement on vertical axes. Said fingers remove a collapsed bag from a bag chute 36 which is supported by member 37 suitably secured to upright 15 and said fingers open the bag, simultaneously locating the same within one of the holders 12, positioned in alignment with the bag chute 36 during the opening operation of said fingers. The plunger 38 descends within the opened bag and holds the same against the support 10 to permit removal of the bag opening fingers. Inasmuch as the bag opening mechanism forms no part of the present invention, only sufficient portions thereof have been herein illustrated to enable the present invention to be understood, and, accordingly, further description is believed unnecessary.

The conveyor 11 remains stationary while the collapsed bag is being removed from the chute 36, opened and located within a holder 12, but upon withdrawal of the fingers 35 and plunger 38 said bag is moved to the next station and subsequently to the next station, whereupon the same is located under a filling hopper 40 which fills the open bag with the proper weight of material, such as bean or ground coffee, sugar, flour, etc.

Figure 3:
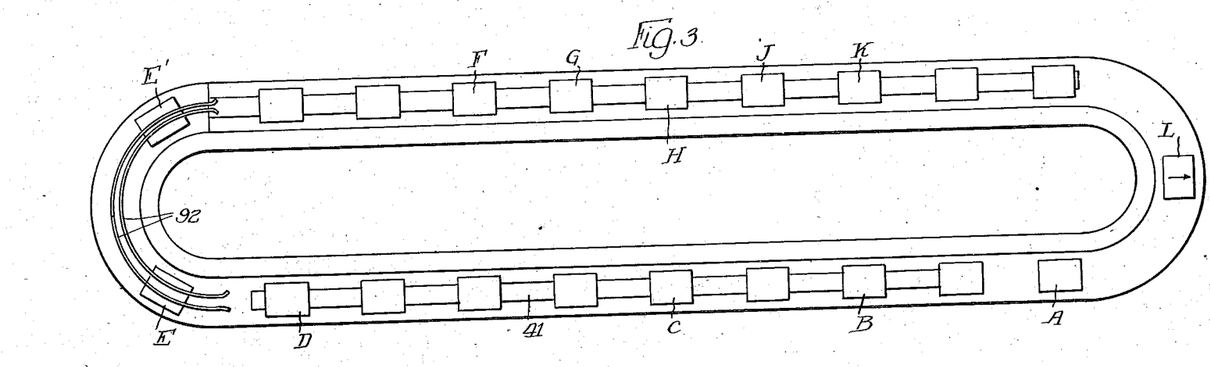
Figure 3 is a diagrammatic plan view showing the supporting platform for the bags and indicating the various stations at which the various operations take place.

Referring to Figure 3, it will be observed that the bag opening station is indicated by A and the bag filling station by B. Continued step by step movement of the conveyor propels the bag through a plurality of stations indicated by C, during which movement the bags are brought into contact with vibrating means for shaking and compacting the material in the bag. Said mechanism consists of a longitudinal member 41, Figures 1 and 3, located in the support 10 and extending for the greater portion of the length of one side of said support. At several places throughout its length the support is formed with a depending lug 42 which pivotally connects with a collar 43 actuated by the eccentric 44 fixed to shaft 45. Said shaft is rotated by the vertical shaft 46 through meshing gears 47 on the shafts, respectively. A driving shaft 48 journalled in bearings 49 extends longitudinally of the machine in the vicinity of the base thereof and operatively connects through bevel gears 50 with shaft 46. The driving shaft is in turn rotated through the chain 51 which operatively connects the shaft with 18 driven by the motor 16. Immediately upon starting up the motor 16 the eccentrics 44 are rotated to vibrate the shaker 41 which has the effect of settling the material in the filled bags while they are being propelled from the filling station B to the next station D, Figure 3, where the upper portion of the bags are collapsed in a manner which will now be described.

Figures 5, 6:
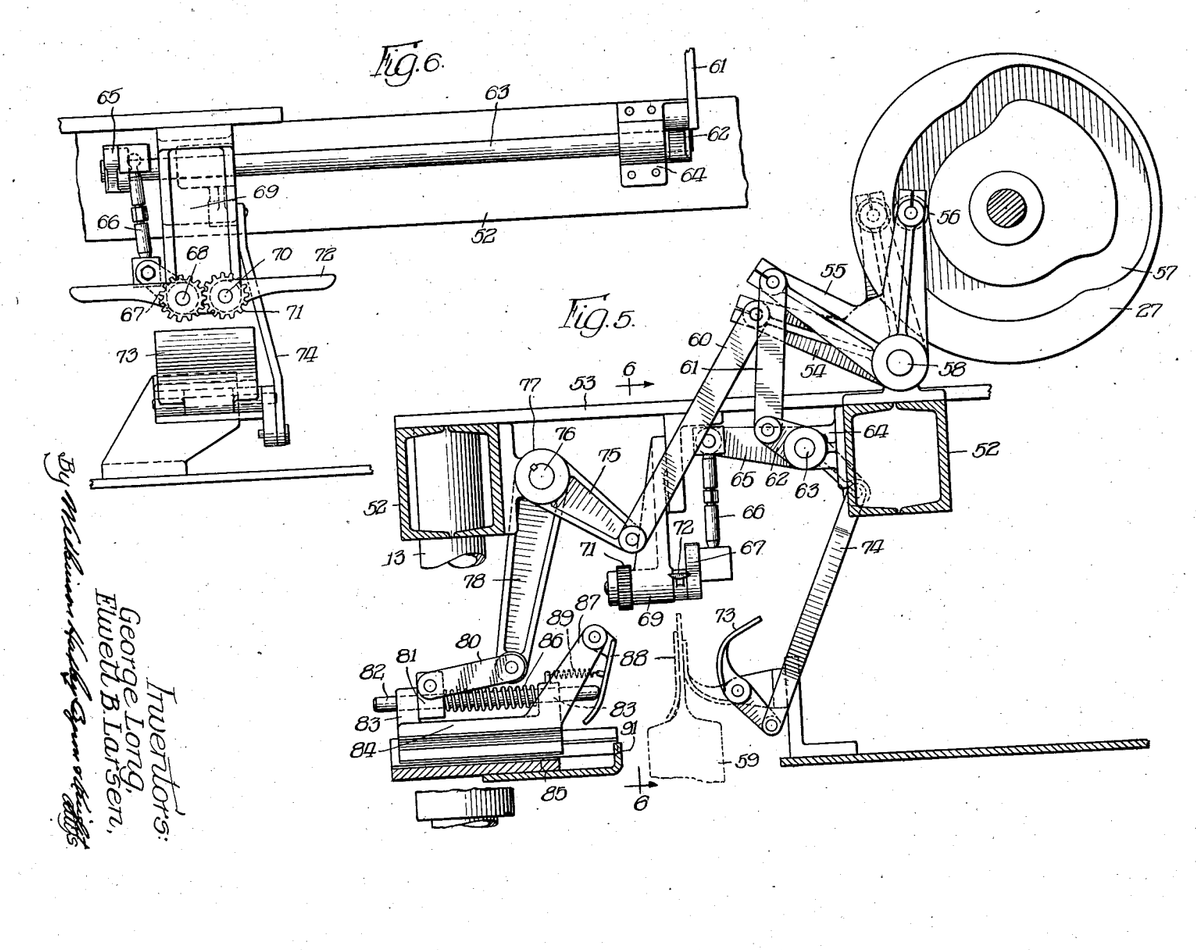
Figure 5 is a fragmentary vertical sectional view showing in detail the collapsing mechanism and the means for operating the same.
Figure 6 is a vertical sectional view taken substantially along line 6—6 of Figure 5 and showing in detail the fingers for tucking in the side walls of the bag.

The upper framework of the present machine consists of a plurality of channel-shaped members 52 arranged in pairs, facing each other, as better shown in Figure 5. Certain pairs form the outside framework of the machine and rest on the upper ends of the uprights 13, 14 and 15. Other pairs of channel-shaped members run centrally of the machine, being suitably supported by the transverse beams 53. The cams 26 and 27, as shown in Figure 5, actuate the bell cranks 54 and 55, respectively, one end of each bell crank carrying a roller 56 riding within a cam race 57 formed in the cam. The bell cranks are pivotally supported by shaft 58 and at their other end are joined to links 60 and 61, respectively. Link 61 is pivotally connected to lever 62 fixed to the shaft 63 suitably journalled in bracket 64. Also fixed to said shaft is a lever 65 having the turnbuckle 66 pivotally secured to its outer end and which is pivotally connected, as shown in Figure 6, with a lever 67 fixed to shaft 68. Said shaft 68 is suitably journalled in bearing 69 which also journals a companion shaft 70, the shafts being operatively connected by means of meshing gears 71. To each shaft is fixed a finger 72 so that the same extends substantially horizontally when the bell crank 54 is positioned as shown in Figure 5. This is the inoperative position of the fingers since when the bell crank is caused to move outwardly by reason of the high portion of cam 27 the connecting linkage will be actuated to move the turnbuckle 66 downwardly, thereby imparting rotation to shaft 68 in a direction to cause movement of the fingers 72 downwardly. This movement of the fingers takes place when a filled bag is temporarily located at station D and thus the side walls of the bag 59, Figure 12, are folded inwardly.

Simultaneously with the above operation of the fingers 72 the member 73 is oscillated since said member operatively connects through link 74 with shaft 63. Actuation of member 73 will result in the rear wall of the bag being forced inwardly toward the vertical center line of the filled bag.

Actuation of bell crank 54 takes place substantially simultaneously with bell crank 55 and accordingly link 60, connecting with lever 75, oscillates shaft 76, journalled in bearing 77. Also fixed to said shaft is another lever 78 connecting by means of link 80 with a block 81 fixed to the rod 82. Said rod is mounted in spaced ears 83 integral with the carrier 84, mounted for horizontal reciprocating movement within member 85. Block 81 is located between the ears 83 and a coil spring 86 is confined between said block and one of said ears. The lug 87, projecting from the carrier, has pivotally secured thereto a member 88 similar to 73 and which is caused to pivot in a counter-clockwise direction by movement of the rod 82, the member 88 being held in contact with the rod by spring 89. When the bell crank 55 is actuated by cam 26, shaft 76 is oscillated, resulting in movement of the carrier 84 within the guides provided by member 85. The member 88 is accordingly caused to contact the front wall of the upper portion of the bag. The carrier will presently strike the stop 91 and further movement of block 81 will be imparted to the rod 82, causing pivotal movement of the member 88 to bring the front wall of the bag into contact with the rear wall, whereupon the upper portion of the bag is fully collapsed, Figure 13.

The collapsed bag is propelled from the collapsing mechanism and delivered to spaced rails 92, Figure 3, of arcuate form and which extend around the elliptical end of the support. The spaced rails serve to retain the upper portion of the bag in collapsed relation and for the purpose the space between the rails progressively decreases in extent. The bags leaving station D are momentarily brought to rest at station E and the next intermittent movement of the conveyor locates the bags at station E'.

Figures 14, 21, 22:
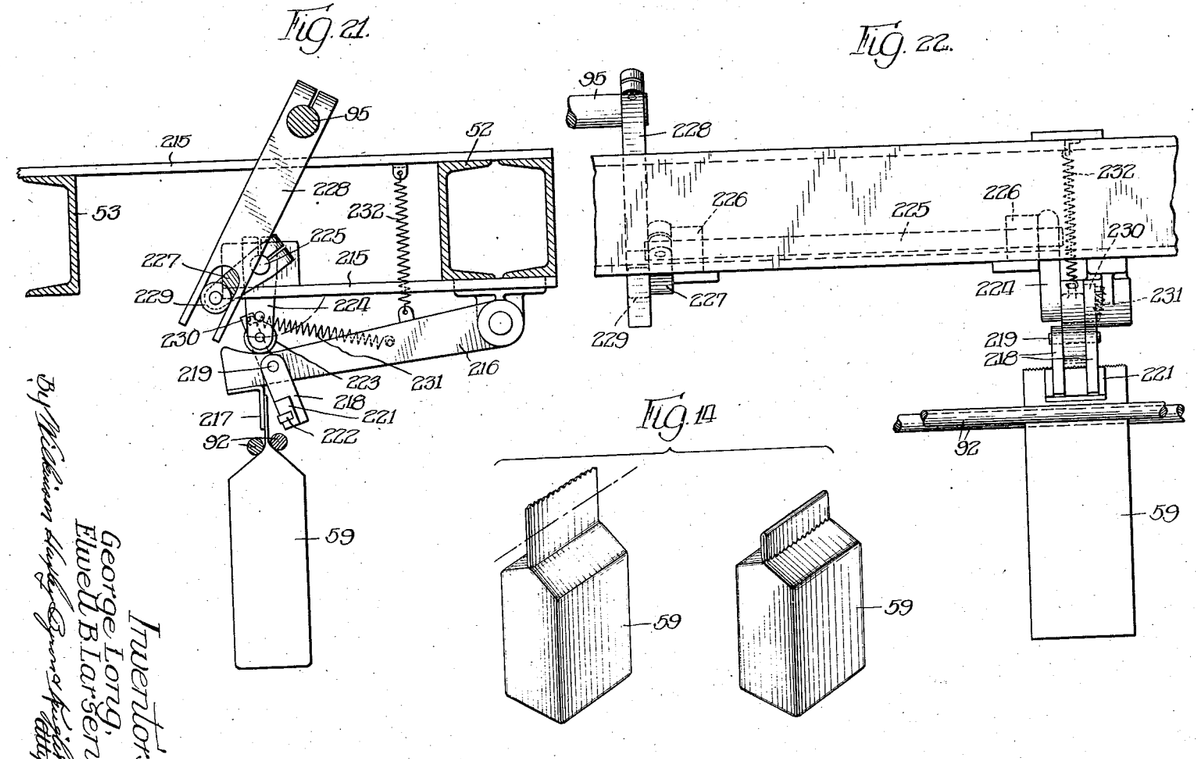
Figure 14 shows views similar to Figure 13 showing the upper collapsed portion of the bag folded in a different manner.
Figure 21 is a front elevational view showing mechanism for lifting the bag.
Figure 22 is a side elevational view of the mechanism illustrating the location of the same with respect to the spaced rails.

While located at station E' the bags are lifted upwardly by mechanism, Figure 21, actuated from shaft 95 and supported from plates 215. Mechanism for accomplishing this function includes a lifting lever 216 pivotally supported from beam 52 and having fixed at its outer end the depending flange portion 217. Said lever also carries at its outer end lifting arms 218 journalled in the lever by pin 219 and having an upward extension 220. A plate 221 connects the arms at their lower ends and is provided with a rubber insert 222. The lever is cammed downwardly, Figure 21, by a roller 223 carried by arm 224 fixed to one end of shaft 225. Said shaft is journalled by bearings 215 and has fixed to its other end an arm 227 which is oscillated by an actuating lever 228 fixed to shaft 95. Lever 228 is formed at its lower end with a U-shaped recess which receives the roller 229 carried by the free end of the arm 227. When arm 224 is in vertical position, Figure 21, the lever 216 assumes its low position, in which position pin 230, projecting from the arm, will engage extension 220 of members 218, producing rotation thereof so as to space the members with respect to flange 217. When the parts are in this position bag 59 is brought to rest at stage E' with its collapsed upper portion located between the lifting instrumentalities, i. e. the flange and the members. Oscillation of arm 224 rearwardly permits upward movement of lever 216 which is biased in this direction by spring 232. The collapsed portion of the bag will be firmly held between the flange and lifting members and as a result of the upward movement of the same the upper filled portion of the bag will be brought into contact with the rails 92. This will have the effect of compacting the coffee in the bag and producing a collapsed upper portion of maximum length.

The bags are eventually propelled to station F, having folding mechanism for folding the collapsed upper portion of the bag to produce a 180 degree fold in the collapsed portion. This mechanism will now be described.

Figure 7:
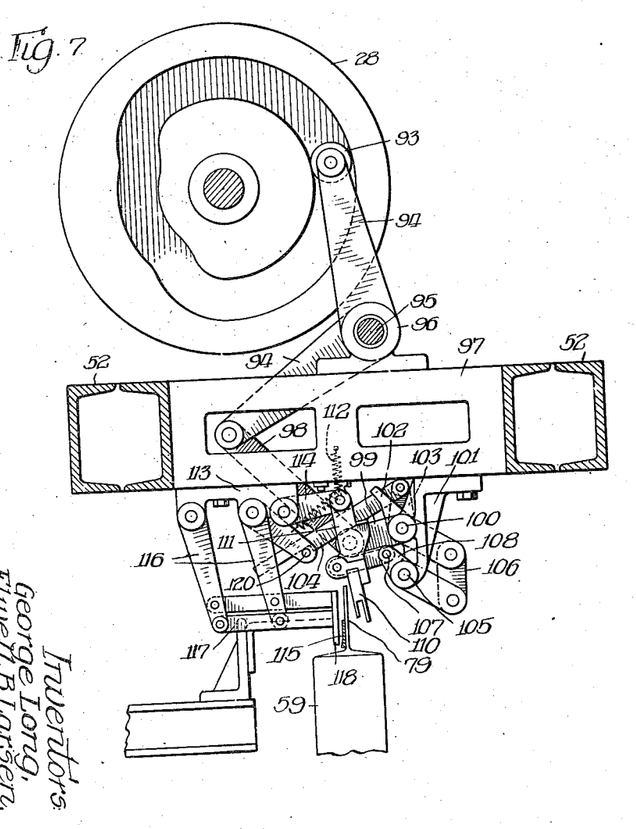
Figure 7 is a fragmentary vertical sectional view showing in detail the mechanism for folding the collapsed upper portion of the bag.
Figure 8:
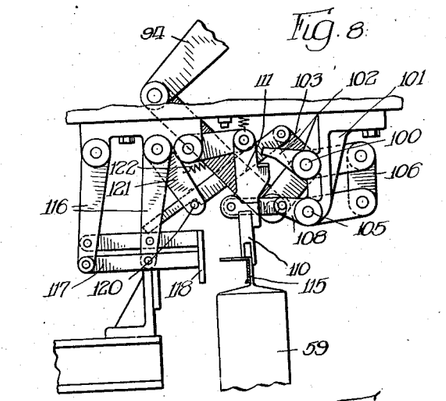
Figure 8 is a fragmentary vertical sectional view similar to Figure 7 but showing the folding mechanism in one position of operation.
Figure 9:
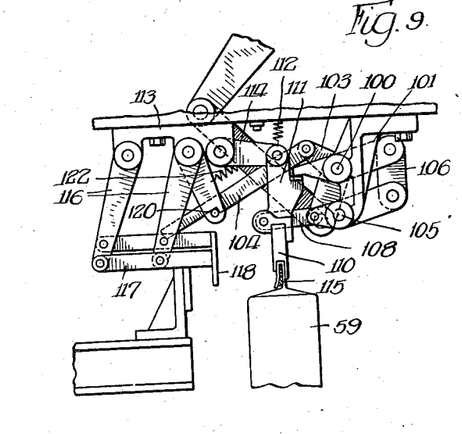
Figure 9 is a fragmentary vertical sectional view similar to Figure 7, showing the folding mechanism in another position of operation.

The folding mechanism shown in Figures 7, 8 and 9 is actuated by cam 28, having a cam race for receiving roller 93, carried by one end of a bell crank 94. The levers of said bell crank are fixed to shaft 95 journalled by bearings 96 supported by member 97 extending between certain pairs of channel-shaped members 52 forming the framework of the machine, as previously described. Link 98, Figure 7, is joined to the depending lever of the bell crank and through link 99 operatively connects with shaft 100 journalled in bearing 101. Also fixed to said shaft is an arm 102 and lever 103, the latter pivotally connecting with member 104. Below shaft 100 bearing 101 journals a companion shaft 105, said shafts being operatively connected by linkage designated in its entirety by 106. Oscillation of shaft 100 will therefore be duplicated by shaft 105, which has fixed thereto arm 107 connected by means of link 108 with the folding member 110, fixed to carrier 111, biased in an upward direction by spring 112 and pivotally supported from bearing 113 by means of link 114.

Actuation of bell crank 95 in a counter-clockwise direction, which occurs by reason of the low portion formed of the cam race in cam 28 will oscillate shaft 100 and shaft 105, and result in pivotal movement of the folding member 110 from an inoperative position, as shown in Figure 7, to an operative position, shown in Figure 8, where the folding member and carrier are positioned substantially vertically. The bag 59, positioned at the folding station F, has its collapsed upper portion 79 located in contact with and along one side of guide member 115. Said member is located to that side of the collapsed upper portion of the bag opposite the folding member 110 when the same is in inoperative position, as shown in Figure 7. Said folding member has a short and a long extension and when the same is caused to pivot as above described, the short extension just clears the guide member 115 which results in bending the projecting section toward the left, Figure 8, producing a 90 degree fold in the collapsed portion. Continued actuation of the bell crank 95 will rotate shaft 100 to bring the arm 102 into contact with the carrier 111 and any further actuation will force the carrier downwardly. By this downward movement of the folding means 110 the horizontally bent upper end of the collapsed portion of the bag is again bent another 90 degrees and is folded over guide member 115, producing a 180 degree fold in said portion. The position the parts assume at this stage in the operation is shown in Figure 9.

Pivotally secured to and depending from bearing 113 are a pair of levers 116 joined at their lower end by links 117 to which are secured the presser plate 118. The presser plate is actuated by member 104 which has a cut away portion engaging pin 120 carried by lever 121, fixed to the same shaft carrying one of the levers 116. Movement is imparted to member 104 by shaft 100 and through the connecting levers and links the presser plate 116 is reciprocated in a rearward direction away from the guide member 115. This takes place as the first 90 degree fold is formed in the collapsed upper portion of the bag. The presser plate is retained in position away from the guide member 115 while the second 90 degree fold occurs, but as the folding means is withdrawn and reverse pivotal movement takes place to again locate the folding means in an inoperative position, the presser plate is caused to advance by the resilient spring 122 and the folded upper portion of the bag is held by said presser plate in contact with the guide member 115.

Figure 11:
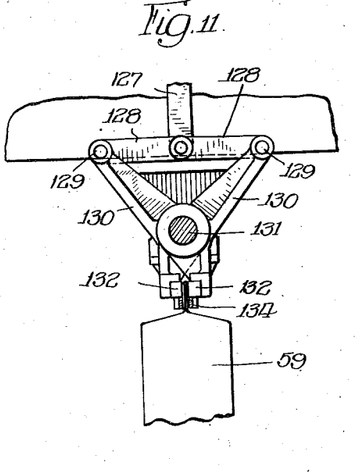
Figure 11 is a view similar to Figure 10 showing the creasing mechanism in the act of creasing the folded upper portion of the bag.

The above folding operation forming a 180° fold in the collapsed portion of the bag takes place while the bag is momentarily at rest at station F. After withdrawal of the folding means the bag is eventually propelled to the next station G, Figure 3, which comprises creasing mechanism for creasing the fold. This mechanism is shown in Figures 10 and 11 and is actuated by cam 29 having the cam race 123 within, which receives a roller fixed to one lever of a bell crank 124. Said bell crank levers are carried by a shaft 58 journalled in bearing 126. The bell crank is connected by member 127 with the toggle links 128 pivotally joined at 129 to arms 130. Said arms are pivotally connected by the pin 131 and extend below said pin to form creasing members 132. The bag 59 having a 180° fold 133 in the collapsed upper portion thereof, Figure 14, is presented to the creasing members upon movement of the conveyor, the fold being guided by the spaced depending portions 134. When the bag is brought to rest the fold will be accurately aligned with the creasing members 132 and the bell crank levers 124 will be presently actuated to cause straightening of the toggle links 128, as shown in Figure 11, and pinching of the fold by the members 132. As a result of this operation the fold is creased and a definite formation, resulting in a sharp upper edge is given to the fold.

Referring again to Figure 3, station H consists of another folding mechanism substantially identical in construction and having operation similar to that disclosed in Figures 7, 8 and 9. At station H the collapsed portion of the bag is folded along a line immediately below the first named fold or along a line substantially mid-way of the first fold. The folding mechanism at station H is actuated by cam 28 from the counter-shaft 95, Figure 2, which therefore drives the mechanisms at stations F and H in unison and at the same speed.

At the succeeding station J, Figure 3, creasing mechanism is provided similar in all respects to that shown in Figures 10 and 11, which forms a crease in said second fold. This creasing mechanism is actuated by cam 29 from the counter-shaft 58, Figure 1.

Figure 13:
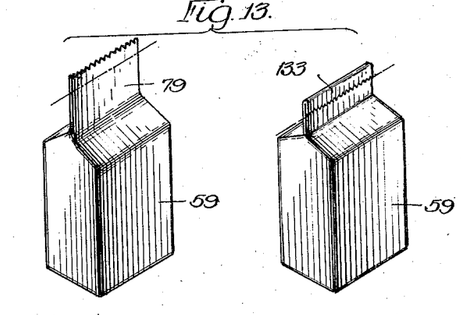
Figure 13 shows perspective views of the bag of Figure 12 after the same has been filled, and with the upper portion thereof collapsed and folded, respectively.

In summing up the above operations, it will be understood that the bag is delivered to station F with its upper portion collapsed as shown in Figure 13. A 180 degree fold is formed in this upper portion on a horizontal line substantially a third or a half of the collapsed portion, depending on the type of fold desired. See Figures 13 and 14. The fold is subsequently creased at station G and a second 180 degree fold is formed at station H, which fold is likewise creased at station J, the folding mechanisms at stations F and H being similar in construction and operation and likewise the creasing mechanisms at stations G and J.

Figure 4:
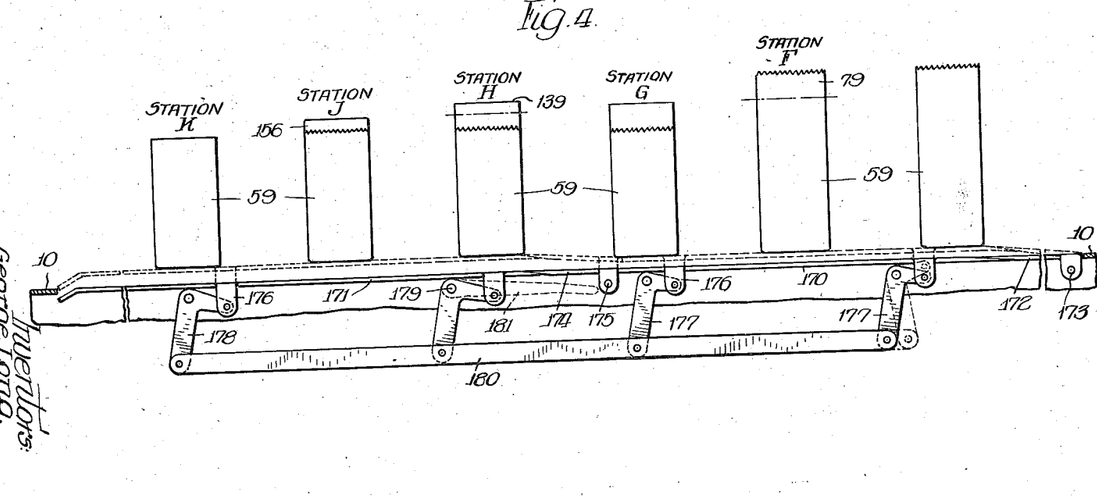
Figure 4 is a front elevational view showing the elevating structure for adjusting the height of the bags.

The folding and creasing mechanisms are in horizontal alignment and accordingly means are provided for raising the bag after the first 180 degree fold has been formed therein to compensate for the reduced height of the bag. This includes elevating structure which is further desirable in that the height of the bag can be adjusted to suit the folding and creasing means. As shown in Figure 4, lift plates 170 and 171 extend longitudinally of the platform at the rear side of the machine. Lift plate 170 is provided at its entering end with a separable part 172 pivoted at 173 forming an approach to the plate when the same is elevated above the level of the platform. A similar part 174, pivoted at 175, is provided with respect to plate 171. Lugs 176 depend from each of the lift plates 170 and 171 at spaced intervals and each lug is pivotally joined to bell cranks. The bell cranks associated with plate 170 are identified by numeral 177 and those associated with plate 171 are identified by numeral 178. These latter are characterized by a longer upper leg than those first mentioned, resulting in a greater throw per unit of movement of the bell cranks. The pivot pins 179 of the bell cranks are fixed and since the link 180 connects the lower end of all the bell cranks, it will be seen that actuation of any bell crank by handle 181 will be transmitted to all. By reason of the greater throw of bell cranks 178 plate 171 will at all times be elevated above plate 170. The bags vary in height due to the nature of their contents and the elevating structure provides simple and convenient means for adjusting the position of the bags vertically. The bags are propelled along the platform and are eventually positioned on lift plate 170, which has been vertically adjusted to properly position the upper end of the bag with respect to the first folding and creasing mechanism. Further movement of the bag will locate the same upon plate 171 and this plate will be automatically raised above 170 to compensate for the reduced height of the bag at this stage in the folding operations. Plate 171 extends from station H to and beyond station K and thus the bag is supported thereby during the second folding and creasing operations and while the fold is being sealed by other means to be described.

Figure 18:
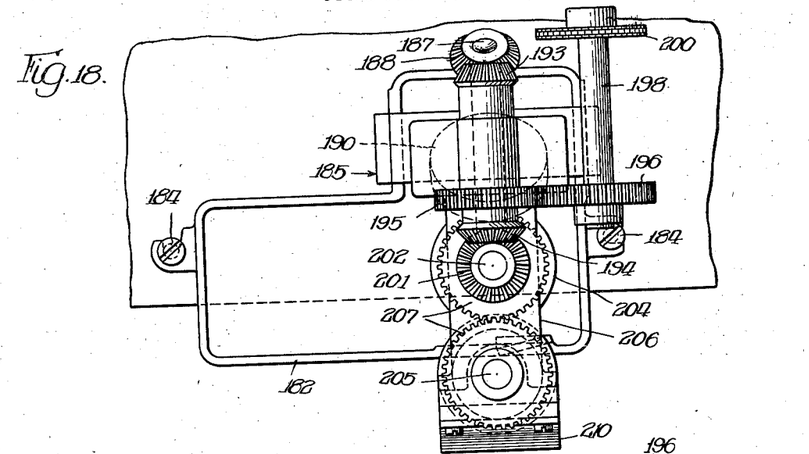
Figure 18 is a top plan view showing the preferred form of gluing mechanism.
Figure 19:
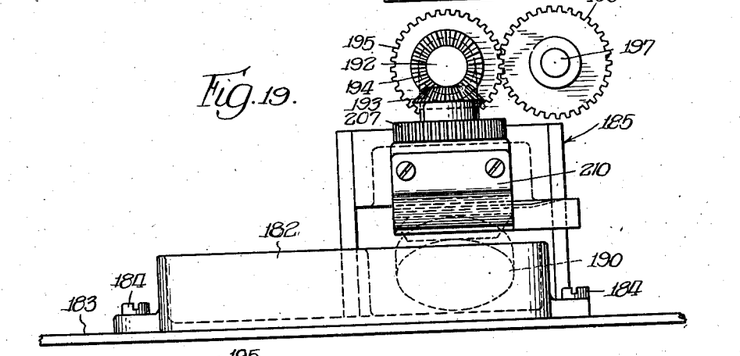
Figure 19 is a side elevational view of the same.
Figure 20:
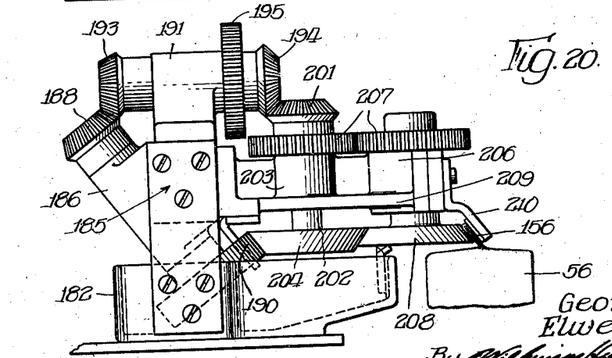
Figure 20 is an elevational view of the same looking in the direction of travel of the bag through the mechanism.

When the bag leaves station J the collapsed section has been folded a plurality of times and the folded portion extends vertically upward from the top of the bag. To complete the closing of the bag it is necessary to press this folded portion flat against the top of the bag, which operation is performed by mechanism shown in detail in Figures 15, 16 and 17. This mechanism is therefore located at station K, Figure 3, and is actuated from shaft 22 having the cams for effecting operation of the folding and creasing mechanisms as above described. This pressing mechanism is peculiar to a machine operating on bags provided with vertical metal stays or strips in the upper portion thereof, since when these strips are omitted from the bag it is necessary to seal the same by gluing the folded portion. Structure for applying glue to the fold of the bag is shown in Figures 18, 19 and 20.

Figures 15, 16:
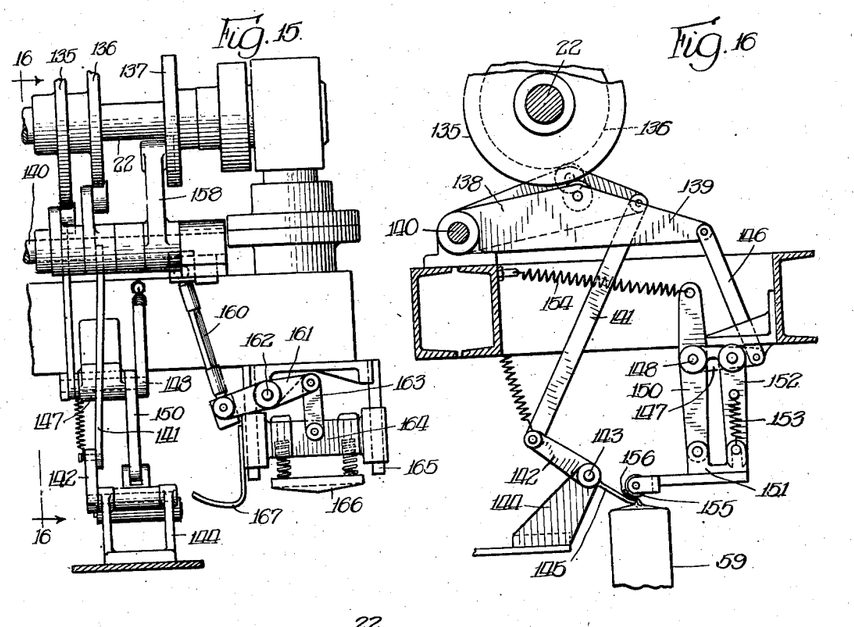
Figure 15 is a side elevational view showing in detail mechanism for pressing the folded portion of the bag flat against the top of the bag.
Figure 16 is a view taken substantially along line 16—16 of Figure 15.
Figure 17:
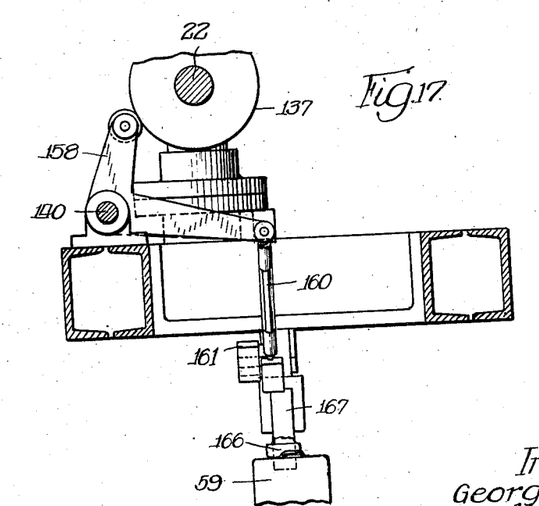
Figure 17 is a fragmentary vertical sectional view of the pressing plate and means for operating the same.

Referring to Figures 15, 16 and 17, shaft 22 is provided with three cams 135, 136 and 137, having rollers engaging their periphery for actuating the levers 138, 139 and 158, which are suitably journalled by shaft 140. To lever 138 is pivotally connected link 141, which is connected by link 142, with shaft 143, journalled in member 144, there being fixed to said shaft a finger 145. Lever 139 is connected by link 146 with lever 147, which is fixed to a shaft 148. Actuation of said shaft imparts movement to lever 150 projecting above and below the shaft and pivotally connecting at its lower end with member 151, which is yieldingly supported at its rear by links 152, joined to the member by a pin and slot connection, the parts being held as shown in Figure 16 by coil spring 153. The coil spring 154 is anchored at one end and connects at its other end with the upper end of lever 150 to thereby bias said lever in a direction to retain the roller of lever 139 in contact with its respective cam 136. Member 151 carries at its outer end a roller 155 which is oscillated in a substantially horizontal plane by the cam 136 through the connecting linkage described.

As the bag 59, having an upstanding folded portion 156, is about to leave station H the roller 155 and the finger 145 will be in separated position. With movement of the bag the roller is then caused to oscillate from right to left and upward pivotal movement is imparted to the finger 145 so that the combined effect of the roller and finger is to engage and bend the folded portion 156 diagonally from the vertical as said bag is moving to station K. It will be understood from the structure above described that during movement toward the roller 155, the folded portion down into contact with finger 145 and variations in the thickness and other characteristics of the folded portion 156 are taken care of by the fact that the rear of the member 151 is yieldingly connected to link 152.

Cam 137 actuates the bell crank 158 having pivotal movement on shaft 140. The lower end of the bell crank is pivotally joined to the turnbuckle 160 adapted to actuate a lever 161 pivotally supported at 162. Link 163 connects the lever with a cross head 164 mounted for vertical reciprocating movement on the vertical rods 165. Said cross head yieldingly carries a presser plate 166 which is formed on its lower surface with a longitudinal groove to receive the folded portion of the bag.

The bag travels from left to right, Figure 15, and before the same is momentarily brought to rest at station K the folded portion is bent over by the finger and roller as described. Further movement of the bag will bring the bent-over folded portion into contact with a depending shoe 167, suitably fixed to the cross head 164. As a result the bent-over folded portion is forced into flat contact with the top of the bag. When the bag is brought to rest at station K it is located directly under the presser plate 166 and downward movement of the cross head 164 presently occurs to bring the presser plate 166 against the folded portion, pressing the same firmly against the top of the bag. Subsequently the presser plate is lifted and movement of the conveyor will propel the bag from station K to the next succeeding stations and presently to station L, where the bag is discharged from the machine.

When the present machine is operated on bags which are not provided with vertical stays for retaining the folded portion of the bag in folded relation it is necessary to glue the folded portion to the body of the bag. Gluing mechanism is therefore substituted for the structure just described for bending over the folded portion and pressing the same into flat contact with the top of the bag. The gluing mechanism is located at station K.

Referring to Figures 18, 19 and 20, wherein a preferred form of gluing mechanism is disclosed, numeral 182 indicates an open container providing a reservoir for the glue and which is securely held to a base plate 183 by threaded members 184. The overhead supporting structure indicated in its entirety by numeral 185 provides a bearing 186 journalling shaft 187, to which is fixed at one end bevel gear 188 and at its lower end the roller 190, located within the reservoir and disposed at an angle to the horizontal. The overhead supporting structure 185 also provides a bearing 191 for journalling shaft 192 having bevel gear 193 at one end thereof meshing with gear 188 and a similar bevel gear 194 at its opposite end. Also fixed to the end adjacent gear 194 is a pinion 195 meshing with similar pinion 196 fixed to the driving shaft 197. Said driving shaft is suitably journalled in bearings 198 and is operatively connected with a source of power by the chain 200. Bevel gear 194 meshes with a similar gear 201 fixed to a vertically disposed shaft 202 journalled in bearings 203. The lower end of shaft 202 is provided with a wheel 204 having a bevelled periphery and which has contact with the roller 190. The rotations of shaft 202 are imparted to a companion vertical shaft 205 journalled by bearing 206 through the meshing gears 207. Fixed to the lower end of shaft 205 is another wheel 208 having a bevelled periphery.

The overhead supporting structure 185 includes the horizontally extending bearing support 209, which provides the bearings 203 and 206. To this arm is suitably fixed a depending lug 210 spaced from the periphery of the bevelled wheel 208 a distance to permit the folded portion 156 of the bag to just pass through, as will be evident from Figure 20. Power from the driving shaft 197 is transmitted to shaft 192 through gears 196 and 195. From shaft 192 power is transmitted to shaft 187 to cause rotation of the reservoir roller 190 which therefore picks up the glue from the reservoir and transfers the same to the bevelled periphery of wheel 204 which likewise is driven from shaft 192. Since wheels 204 and 208 are operatively connected by the meshing gears 207, the latter wheel will have positive rotation and the glue from the wheel 204 will be transferred thereto. Movement of the bags by the conveyor 11 will bring a bag between wheel 208 and the depending lug 210 and since the space between these parts just accommodates the folded portion of the bag, said portion will be positively engaged by the bevel wheel 208. Therefore the glue on the bevelled periphery of said wheel will be applied to the undersurface of the folded portion, as shown in Figure 20, and when said portion is pressed down onto the bag, the folded portion will be caused to adhere to the top surface of the bag, thereby sealing the same.

What is claimed is:

1. In a bag closing machine, the combination of an endless conveyor for propelling the bags, means for forming a 180 degree fold in the upper portion of the bag, means for forming a second 180 degree fold in the upper portion of the bag, and elevating means for positioning the bags with respect to said second mentioned folding means to compensate for the decreased height of said bag as a result of the first fold in the upper portion thereof.

2. In a bag closing machine, the combination of an endless conveyor for intermittently propelling the bags, means for forming a 180 degree fold in the upper portion of the bag, means for creasing said fold, means for forming a second 180 degree fold in the upper portion of the bag, means for creasing said second mentioned fold and elevating means for properly positioning the bags with respect to said folding means and creasing means.

3. In a bag closing machine, the combination of an endless conveyor for intermittently propelling the bags, means for forming a 180 degree fold in the upper portion of the bag, means for creasing said fold, means for forming a second 180 degree fold, means for creasing said second mentioned fold, elevating means for positioning the bags with respect to said folding means and creasing means and mechanism for pressing the folded portion of the bag into flat engagement with the top of the bag.

4. In a bag closing machine, the combination of an endless conveyor for intermittently propelling the bags, mechanism for tucking in the side walls and for collapsing the front and rear walls of the upper portion of the bags, spaced members gradually converging toward their end remote from the collapsing mechanism for retaining the upper portion in collapsed relation while the bag is being propelled the length of said members, and separate and independent means located beyond the converging end of said spaced members for folding the collapsed portion of the bag and for creasing said fold.

5. In a bag closing machine, a substantially horizontal support for the bags, an endless conveyor of elliptical form for intermittently propelling the bags, means collapsing the bags, spaced members of approximately U-shape extending around one end of the elliptical conveyor for retaining the bags in collapsed relation while they are propelled the length of said members, and means for folding the collapsed portion of the bag.

6. In a bag closing machine, a substantially horizontal support for the bags, an endless conveyor of elliptical form for intermittently propelling the bags, means collapsing the bags, spaced members at one end of the elliptical conveyor for retaining the bags in collapsed relation, means receiving the bags from the spaced members and forming a 180 degree fold in the collapsed portion thereof, and a second folding means forming another 180 degree fold in the upper portion of the bag.

7. In a bag closing machine, a substantially horizontal support for the bags, an endless conveyor of elliptical form for intermittently propelling the bags, means collapsing the bags, spaced members at one end of the elliptical conveyor for retaining the bags in collapsed relation, means receiving the bags from the spaced members and forming a 180 degree fold in the collapsed portion thereof, means for creasing said fold, a second folding means forming another 180 degree fold in the upper portion of the bag, and means for creasing said second fold.

8. In a bag closing machine, a substantially horizontal support for the bags, an endless conveyor of elliptical form for intermittently propelling the bags, means collapsing said bags, spaced members at one end of the elliptical conveyor for retaining the bags in collapsed relation, means receiving the bag from the spaced members and forming a 180 degree fold in the collapsed portion thereof, means for creasing said fold, a second folding means forming another 180 degree fold in the upper portion of the bag, means for creasing said second fold, and mechanism for pressing the folded portion of the bag into flat engagement with the top of the bag.

9. In a bag filling and closing machine, the combination of an endless conveyor for intermittently propelling the bags, means for collapsing the upper portion of the bags after they have been filled, a folding member having spaced legs depending therefrom for forming a 180° fold in the collapsed portion of the bag, means supporting said member for pivotal movement and for vertical bodily movement, and means actuating said member to cause pivotal movement and then vertical movement bodily in a downward direction.

10. In a bag filling and closing machine, the combination of an endless conveyor for intermittently propelling the bags, means for collapsing the upper portion of the bags after they have been filled, a folding member having spaced legs depending therefrom for forming a 180° fold in the collapsed portion of the bag, means supporting said member for pivotal movement and for vertical bodily movement, and means actuating said member to cause pivotal movement and then vertical movement bodily in a downward direction, one leg of said folding member cooperating with a guide member to produce a 90° fold by pivotal movement of the folding member and then another 90° fold by bodily movement of the folding member in a downward direction.

11. In a bag filling and closing machine, the combination of an endless conveyor for intermittently propelling the bags, means for collapsing the upper portion of the bags after filling thereof, means for folding said collapsed portion including a folding member having a substantially U-shaped extremity with one leg thereof shorter than the other and said legs depending from the member, and means supporting said folding member for pivotal movement and for vertical bodily movement.

12. In a bag filling and closing machine, the combination of an endless conveyor for intermittently propelling the bags, means for collapsing the upper portion of the bags after filling thereof, means for folding said collapsed portion including a folding member having a substantially U-shaped extremity with one leg thereof shorter than the other and said legs depending from the member, and an upright guide member extending horizontally immediately below the said U-shaped extremity of the folding member.

13. In a bag filling and closing machine, the combination of an endless conveyor for intermittently propelling the bags, means at one station for collapsing the upper portion of the bags after filling thereof, means at another station for folding said collapsed portion including a folding member having pivoting movement and bodily movement in a substantially vertical plane, said member forming a 180° fold in said collapsed portion, and a presser plate at said folding station for pressing said fold after the folding member has been retracted.

14. In a bag filling and closing machine, the combination of an endless conveyor for intermittently propelling the bags, means for collapsing the upper portion of the bags after filling thereof, means for folding said collapsed portion including a folding member having pivoting movement and bodily movement in a substantially vertical plane, a guide member associated with said folding member, said folding member bending the collapsed upper portion of the bag over the guide upon pivotal movement thereof to produce a 90° fold, and further bending the same upon bodily downward movement to form a 180° fold, and a presser plate pressing said fold against the guide after the folding member has been retracted.

15. In a bag filling and closing machine, the combination of an endless conveyor for intermittently propelling the bags, means for collapsing the upper portion of the bags after filling thereof, means for folding said collapsed portion including a folding member having pivotal movement and bodily movement in a substantially vertical plane, a guide member associated with said folding member, said folding member bending the collapsed upper portion of the bag over the guide to form a 180° fold, and a presser plate pressing said fold against the guide after the folding member has been retracted, said presser plate being actuated by the same means actuating the folding member.

16. In a bag filling and closing machine, the combination of an endless conveyor for intermittently propelling the bags, whereby said bags move from station to station throughout the machine, means at one station for collapsing the upper portion of the bag, means at a subsequent station for folding the collapsed portion, means located at the next station for creasing the fold, and means for forming a second fold in the collapsed portion of the bag, the means for forming the second fold being located at a different station but being identical in construction to the means for forming the first mentioned fold.

17. In a bag filling and closing machine, the combination of an intermittently moving conveyor for propelling the bags, means for folding the upper portion of the bags after filling thereof, means including pivoted fingers and a bodily movable roller for momentarily engaging the folded portion to bend the same into an angular position from the vertical, and other means for pressing the bent folded portion into flat contact with the top of the bag.

18. In a bag filling and closing machine, the combination of an intermittently moving conveyor for propelling the bags, means for folding the upper portion of the bags after filling thereof, means including pivoted fingers and a bodily movable roller for momentarily engaging the folded portion to bend the same into an angular position from the vertical, and a vertically reciprocating pressing member for pressing the bent folded portion into flat contact with the top of the bag.

19. In a bag filling and closing machine, the combination of an intermittently moving conveyor for propelling the bags, means for folding the upper portion of the bags after filling thereof, means including pivoted fingers and a bodily movable roller for momentarily engaging the folded portion to bend the same into an angular position from the vertical, and a vertically reciprocating pressing member for yieldingly pressing the bent folded portion into flat contact with the top of the bag.

20. In a bag closing machine, the combination of an endless conveyor for intermittently propelling the bags, means for forming a 180 degree fold in the upper portion of the bag, means for creasing said fold, means for forming a second 180 degree fold in the upper portion of the bag, said operations occurring in succession while said bags remain at rest, and elevating means for positioning the bags with respect to said second mentioned folding means to compensate for the decreased height of said bag as a result of the first fold in the upper portion thereof.

GEORGE LONG.
ELWELL B. LARSEN.